(12) United States Patent
Boyer et al.

(10) Patent No.: US 12,043,373 B2
(45) Date of Patent: Jul. 23, 2024

(54) ON THE GROUND DETECTION FOR VTOL AIRCRAFT

(71) Applicant: Textron Innovations Inc., Providence, RI (US)

(72) Inventors: Philip Reese Boyer, Colleyville, TX (US); Jerry Allen Pongratz, North Richland Hills, TX (US); Mason James Harvey, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 44 days.

(21) Appl. No.: 17/978,904

(22) Filed: Nov. 1, 2022

(65) Prior Publication Data

US 2023/0133313 A1 May 4, 2023

Related U.S. Application Data

(60) Provisional application No. 63/275,032, filed on Nov. 3, 2021.

(51) Int. Cl.
*B64C 25/60* (2006.01)
*G01L 5/00* (2006.01)

(52) U.S. Cl.
CPC ............ *B64C 25/60* (2013.01); *G01L 5/0052* (2013.01)

(58) Field of Classification Search
CPC ......... B64C 25/36; B64C 25/22; B64C 25/60; B64C 25/001; B64C 2025/008; G01L 5/0052; G01L 5/0061; G01L 5/0028; G01G 5/04; G01G 19/07; F16F 9/3264; F16F 9/3292; B60G 2400/252; B60G 2401/12

See application file for complete search history.

(56) References Cited

U.S. PATENT DOCUMENTS

| | | |
|---|---|---|
| 5,205,514 A | 4/1993 | Patzig et al. |
| 8,055,396 B2 | 11/2011 | Yates et al. |
| 8,359,932 B2 | 1/2013 | Eriksen et al. |
| 10,266,249 B2 | 4/2019 | Shue |
| 10,899,435 B2 | 1/2021 | Baird |
| 2010/0161174 A1* | 6/2010 | Yates ............... G01G 19/07 701/16 |
| 2018/0149545 A1* | 5/2018 | Parkhurst ............ G01M 1/125 |

* cited by examiner

*Primary Examiner* — Brady W Frazier
*Assistant Examiner* — Peter A Taraschi
(74) *Attorney, Agent, or Firm* — Lawrence Youst PLLC (57) ABSTRACT

A landing gear for an aircraft includes a landing strut having proximal and distal ends with the proximal end couplable to the fuselage of the aircraft. The landing strut includes a gas chamber, a liquid chamber, a cylinder and a piston that is movable relative to the cylinder between extended and retracted positions. A wheel is coupled to the distal end of the landing strut. A force sensor is disposed between an extend stop surface of the piston and the chamber. Pressurized gas in the gas chamber biases the piston to the extended position such that the force sensor experiences a preload force. The force sensor is configured to detect a reduction in the preload force during a landing maneuver responsive to contact between the wheel and a landing surface.

20 Claims, 8 Drawing Sheets

ON THE GROUND DETECTION FOR VTOL AIRCRAFT

CROSS-REFERENCE TO RELATED APPLICATIONS

The present application claims the benefit of U.S. Provisional Application No. 63/275,032, filed Nov. 3, 2021.

GOVERNMENT RIGHTS

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD OF THE DISCLOSURE

The present disclosure relates, in general, to landing systems on aircraft having a vertical takeoff and landing flight mode and, in particular, to on the ground detection systems that provide an early indication of when the aircraft has transitioned from an in the air condition to an on the ground condition during a landing maneuver.

BACKGROUND

Vertical takeoff and landing (VTOL) aircraft are capable of taking off and landing without the need for a runway. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Another example of a VTOL aircraft is a tiltrotor aircraft that includes a set of proprotors that can change their plane of rotation based on the operation being performed. Tiltrotor aircraft generate lift and forward propulsion using the proprotors that are typically coupled to nacelles mounted near the ends of a fixed wing. The nacelles rotate relative to the fixed wing such that the proprotors have a generally horizontal plane of rotation in a VTOL flight mode and a generally vertical plane of rotation while cruising in a forward flight mode, wherein the fixed wing provides lift and the proprotors provide forward thrust.

In modern fly-by-wire VTOL aircraft, the control logic used by the automatic flight control system may vary depending upon the mission and/or the maneuver being performed. For example, the control logic used during the in the air condition of the aircraft may be different from the control logic used during the on the ground condition of the aircraft. Consequently, it is important for the automatic flight control system to know whether the aircraft is in the air or on the ground including when the aircraft transitions from the in the air condition to the on the ground condition during a landing maneuver. Attempts have been made to use various weight on wheel sensors, such as limit switches or proximity switches, to determine when the air to ground transition has taken place. It has been found, however, that conventional weight on wheel sensors require significant displacement of components within the landing gear in order to obtain an on the ground indication which results in an undesirable delay in switching from the in the air control logic to the on the ground control logic. Accordingly, a need has arisen for an improved on the ground detection system that provides an early indication of when the aircraft has transitioned from air to ground during a landing maneuver.

SUMMARY

In a first aspect, the present disclosure is directed to a landing gear for an aircraft that includes a landing strut having proximal and distal ends with the proximal end couplable to the fuselage of the aircraft. The landing strut includes a gas chamber, a liquid chamber, a cylinder and a piston that is movable relative to the cylinder between extended and retracted positions. A wheel is coupled to the distal end of the landing strut. A force sensor is disposed between an extend stop surface of the piston and the chamber. Pressurized gas in the gas chamber biases the piston to the extended position such that the force sensor experiences a preload force. The force sensor is configured to detect a reduction in the preload force during a landing maneuver responsive to contact between the wheel and a landing surface.

In some embodiments, the landing strut may be a thru-piston shock strut wherein the cylinder includes the liquid chamber and the piston includes the gas chamber. In other embodiments, the landing strut may be a gas over liquid shock strut wherein the piston includes the liquid chamber and the cylinder includes the gas chamber. In certain embodiments, the liquid chamber may be an oil chamber. In some embodiments, the gas chamber may be an air chamber or a nitrogen chamber. In certain embodiments, the force sensor may include one or more load cells, one or more linear variable differential transformers, one or more strain gauges, one or more pneumatic pressure sensors and/or one or more hydraulic pressure sensors. In some embodiments, the force sensor may be a compressible ring having a central opening configured to slidably receive the piston therethrough and having a main body with at least one force sensing element disposed therein.

In certain embodiments, the force sensor may be configured to detect the reduction in force from the preload force during load balancing of the landing strut as the piston transitions from tension to compression during the landing maneuver. In such embodiments, the force sensor may be configured to detect the reduction in force from the preload force during load balancing of the landing strut before the extend stop surface of the piston translates relative to the chamber during the landing maneuver. In other embodiments, the force sensor may be configured to detect the reduction in force from the preload force during load balancing of the landing strut when the extend stop surface of the piston translates relative to the chamber during the landing maneuver. In some embodiments, the extend stop surface of the piston may be internal to the cylinder. In other embodiments, the extend stop surface of the piston may be external of the cylinder.

In a second aspect, the present disclosure is directed to an aircraft that includes a fuselage and a plurality of landing gear coupled to the fuselage. Each of the landing gear includes a landing strut having proximal and distal ends with the proximal end coupled to the fuselage of the aircraft. The landing strut includes a gas chamber, a liquid chamber, a cylinder and a piston that is movable relative to the cylinder between extended and retracted positions. A wheel is coupled to the distal end of the landing strut. A force sensor is disposed between an extend stop surface of the piston and the chamber. Pressurized gas in the gas chamber biases the piston to the extended position such that the force sensor experiences a preload force. The force sensor is configured to detect a reduction in the preload force during a landing maneuver responsive to contact between the wheel and a landing surface.

In some embodiments, the aircraft may be a rotorcraft such as a tiltrotor aircraft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
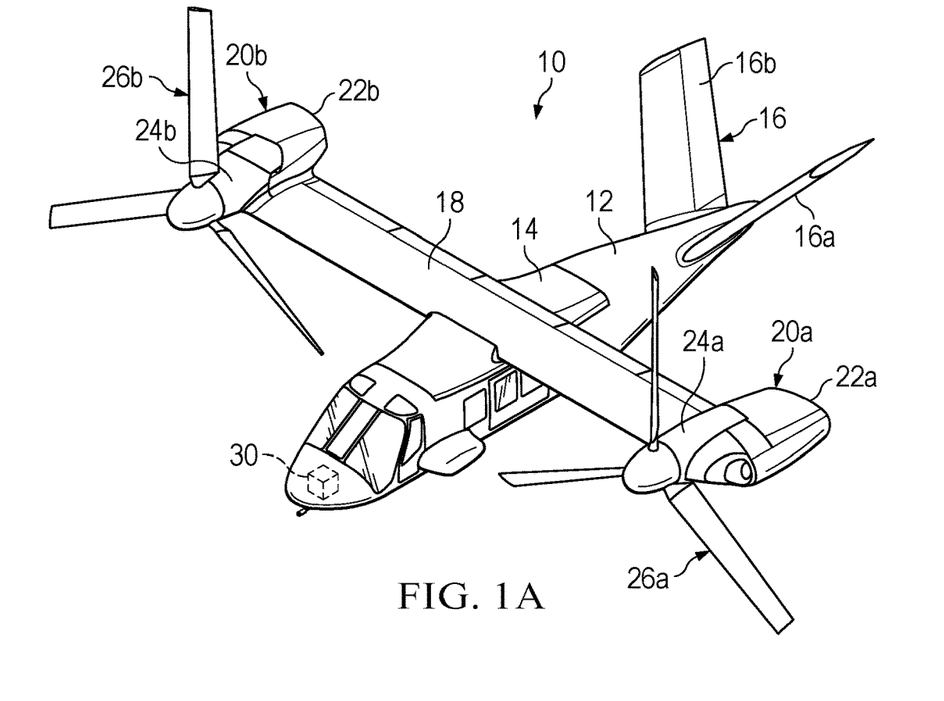
FIGS. 1A-1B are schematic illustrations of a tiltrotor aircraft having landing gear with an on the ground detection system in accordance with embodiments of the present disclosure.
Figure 1B:
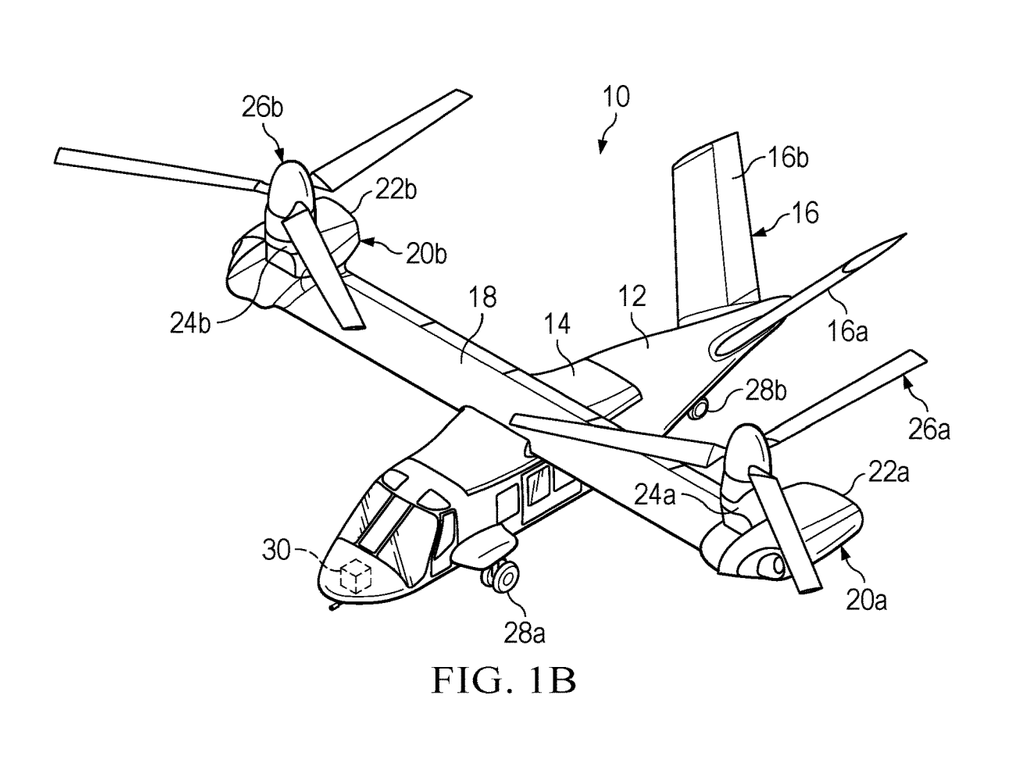

Referring to FIGS. 1A-1B in the drawings, a rotorcraft depicted as a tiltrotor aircraft is schematically illustrated and generally designated 10. Aircraft 10 includes a fuselage 12, a wing mount assembly 14 and a tail assembly 16 including tail members 16a, 16b having control surfaces operable for horizontal and/or vertical stabilization during forward flight. A wing member 18 is supported by wing mount assembly 14. Located at outboard ends of wing member 18 are propulsion assemblies 20a, 20b. Propulsion assembly 20a includes a nacelle depicted as fixed pylon 22a that houses an engine and transmission. In addition, propulsion assembly 20a includes a mast assembly 24a that is rotatable relative to fixed pylon 22a between a generally horizontal orientation, as best seen in FIG. 1A, a generally vertical orientation, as best seen in FIG. 1B. Propulsion assembly 20a also includes a proprotor assembly 26a that is rotatable relative to mast assembly 24a responsive to torque and rotational energy provided via a drive system mechanically coupled to the engine and transmission. Likewise, propulsion assembly 20b includes a nacelle depicted as fixed pylon 22b that houses an engine and transmission, a mast assembly 24b that is rotatable relative to fixed pylon 22b and a proprotor assembly 26b that is rotatable relative to mast assembly 24b responsive to torque and rotational energy provided via a drive system mechanically coupled to the engine and transmission.

Aircraft 10 includes a landing gear system including a pair of forward landing gear 28a and an aft landing gear 28b each including an on the ground detection system. Each of the on the ground detection systems is preferably linked to a flight control system 30 that executes control logic to provide commands to operate the fly-by-wire control system of aircraft 10. As the control logic used during the in the air condition is different from the control logic used during the on the ground condition for aircraft 10, the on the ground detection systems incorporated into landing gear 28a, 28b provide an early indication of when aircraft 10 has transitioned from the in the air condition to the on the ground condition during landing maneuvers such that the proper control logic is executed by flight control system 30. Each of forward landing gear 28a and aft landing gear 28b is coupled to fuselage 12 and is rotatable relative thereto such that forward landing gear 28a and aft landing gear 28b can be retracted into fuselage 12 during flight, as best seen in FIG. 1A.

FIG. 1A illustrates aircraft 10 in airplane or forward flight mode, in which proprotor assemblies 26a, 26b are rotating in a substantially vertical plane to provide a forward thrust enabling wing member 18 to provide a lifting force responsive to forward airspeed, such that aircraft 10 flies much like a conventional propeller driven aircraft. FIG. 1B illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. It should be appreciated that aircraft 10 can be operated such that proprotor assemblies 26a, 26b are selectively positioned between forward flight mode and VTOL flight mode, which can be referred to as a conversion flight mode.

Figure 2A:
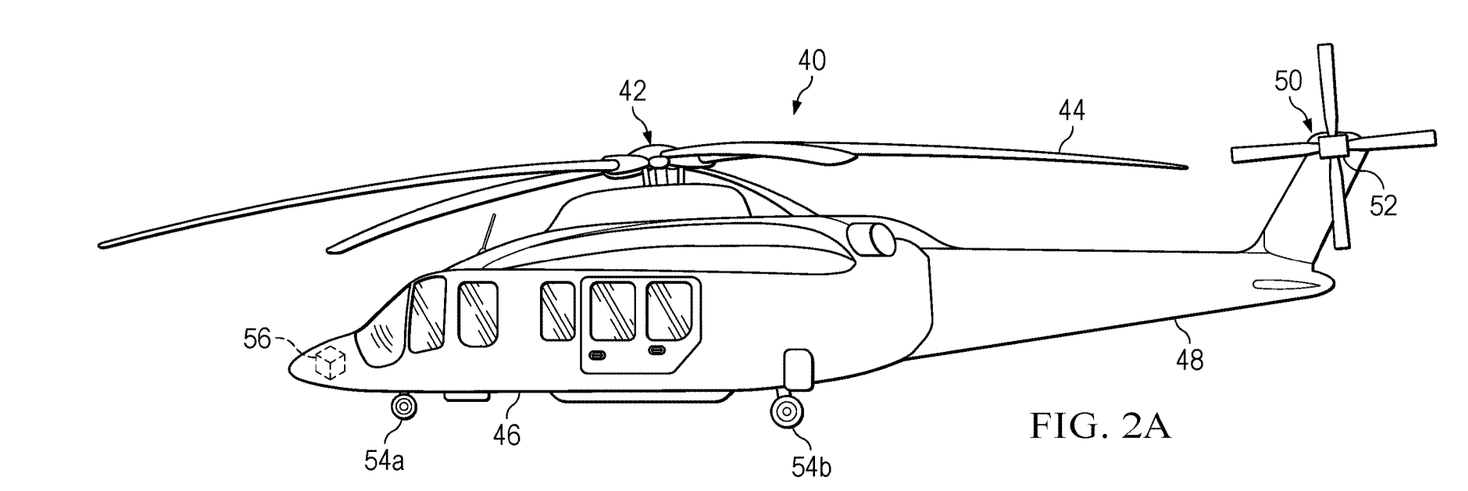
FIGS. 2A-2B are schematic illustrations of a helicopter having landing gear with an on the ground detection system in accordance with embodiments of the present disclosure.
Figure 2B:
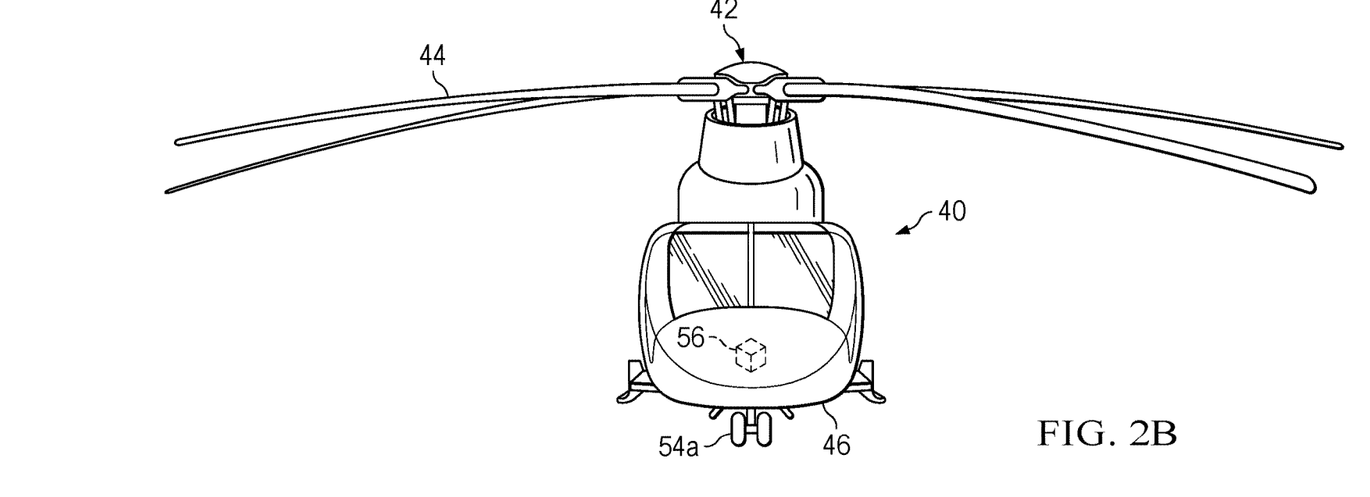

Referring to FIGS. 2A-2B in the drawings, a rotorcraft depicted as a helicopter is schematically illustrated and generally designated 40. The primary propulsion assembly of helicopter 40 is a main rotor assembly 42 powered by one or more engines via a main rotor gearbox. Main rotor assembly 42 includes a plurality of rotor blade assemblies 44 extending radially outward from a main rotor hub. Main rotor assembly 42 is coupled to a fuselage 46 and is rotatable relative thereto. The pitch of rotor blade assemblies 44 can be collectively and/or cyclically manipulated to selectively control direction, thrust and lift of helicopter 40. A tailboom 48 extends from fuselage 46 in the aft direction. An antitorque system 50 includes a tail rotor 52 that is rotatably coupled to the aft portion of tailboom 48. Anti-torque system 50 controls the yaw of helicopter 40. Helicopter 40 includes a landing gear system including a forward landing gear 54a and a pair of aft landing gear 54b each including an on the ground detection system. Each of the on the ground detection systems is preferably linked to a flight control system 56 that executes control logic to provide commands to operate the fly-by-wire control system of helicopter 40. As the control logic used during the in the air condition is different from the control logic used during the on the ground condition for helicopter 40, the on the ground detection systems incorporated into landing gear 54a, 54b provide an early indication of when helicopter 40 has transitioned from the in the air condition to the on the ground condition during landing maneuvers such that the proper control logic is executed by flight control system 56. Each of forward landing gear 54a and aft landing gear 54b is coupled to fuselage 46 and is rotatable relative thereto such that forward landing gear 54a and aft landing gear 54b can be retracted into fuselage 46 during flight.

Referring now to FIGS. 3A-3D of the drawings, a land gear that is representative of landing gear 28a, 28b, 54a, 54b is schematically illustrated and generally designated 100. In the illustrated embodiment, landing gear 100 includes a thru-piston shock strut depicted as having an outer cylinder 102 that defines a liquid chamber referred to herein as oil chamber 104 that contains a hydraulic fluid such as oil therein as indicated by wavy lines 106. Slidably and sealingly received within and extending through cylinder 102 is a piston 108 that defines a gas chamber referred to herein as air chamber or nitrogen chamber 110 that contains a gas such as air or nitrogen therein as indicated by stippling 112. Piston 108 also defines a liquid chamber referred to herein as oil chamber 114 that contains a hydraulic fluid such as oil therein as indicated by wavy lines 116. Fluid communication between nitrogen chamber 110 and oil chamber 114 is prevented by a fluid separator 118 that is positioned between nitrogen chamber 110 and oil chamber 114. Fluid separator 118 is a floating separator that not only isolates the gas in nitrogen chamber 110 from the liquid in oil chamber 114 but also enables pressure balancing between nitrogen chamber 110 and oil chamber 114. Oil chamber 114 is in fluid communication with oil chamber 104 via an orifice 120 that regulates the flow of liquid therebetween.

In the illustrated embodiment, the lower portion of piston 108 extends through a lower end of cylinder 102 with the lower distal end of piston 108 coupled to a wheel assembly including an axle 122 and a wheel 124 that is rotatably coupled to axle 122. The upper portion of piston 108 extends through an upper end of cylinder 102 with the upper end of piston 108 coupled to a flange 126 that has a lower surface configured to hold piston 108 in the fully extended position relative to cylinder 102 that is referred to herein as extend stop surface 128 and that is external of cylinder 102. An on the ground detection system depicted as force sensor 130 is disposed between an upper surface of cylinder 102 and extend stop surface 128 of piston 108. Force sensor 130 is preferably in communication with the aircraft's flight control system, such as flight control system 30 of aircraft 10 or flight control system 56 of helicopter 40, to provide a signal that the aircraft is on the ground such as to provide an early indication of when the aircraft has transitioned from an in the air condition to an on the ground condition during a landing maneuver.

Figure 3A:
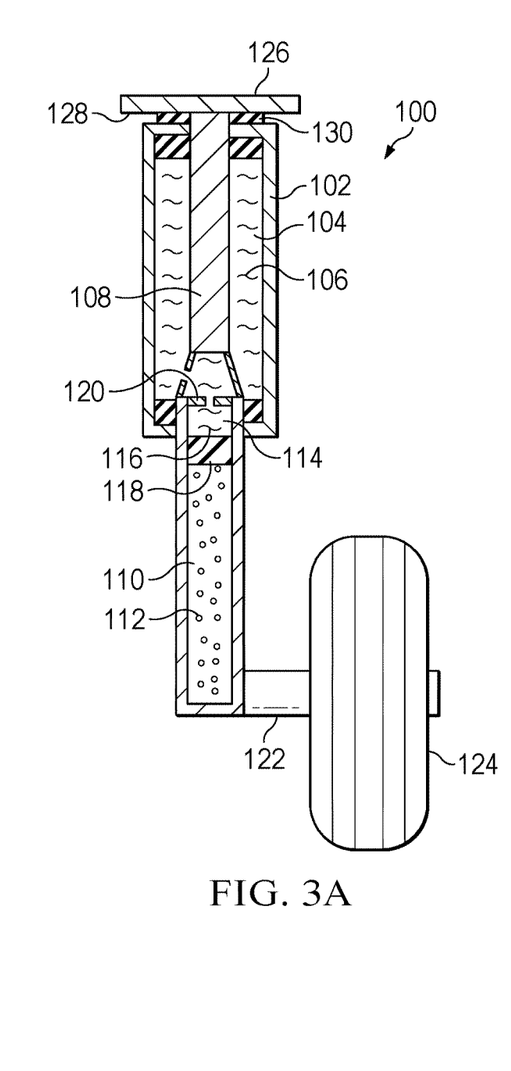
FIGS. 3A-3D are schematic illustrations of a landing gear with an on the ground detection system in various operating configurations in accordance with embodiments of the present disclosure.

The operation of landing gear 100 will now be described. In FIG. 3A, landing gear 100 is in the fully extended position. Landing gear 100 would be in this position, for example, when the aircraft has deployed landing gear 100 during flight in preparation for a landing maneuver. In the illustrated embodiment, the pressure of the gas in nitrogen chamber 110 creates the force that causes piston 108 to be in the fully extended position relative to cylinder 102 with extend stop surface 128 preventing any further movement of piston 108 relative to cylinder 102. In this configuration, force sensor 130 which is disposed between an upper surface of cylinder 102 and extend stop surface 128 of piston 108, experiences a compressive force referred to herein as a preload force. The preload force is a result of the reaction force between piston 108 and cylinder 102 at extend stop surface 128 created by the gas pressure in nitrogen chamber 110 and the oil pressure in oil chambers 104, 114 which places piston 108 in tension. When wheel 124 comes in contact with a landing surface 132, such as the ground, a landing force is exerted on wheel 124 by the landing surface 132. In response to the external landing force applied to wheel 124, landing gear 100 experiences a load balancing process that involves reduction in the tensile force in piston 108, an increase in the pressure in oil chamber 104 as piston 108 begins to move upwardly relative to cylinder 102 and an increase in the gas pressure in nitrogen chamber 110 as the liquid from oil chamber 104 enters oil chamber 114 through orifice 120.

Figure 3B:
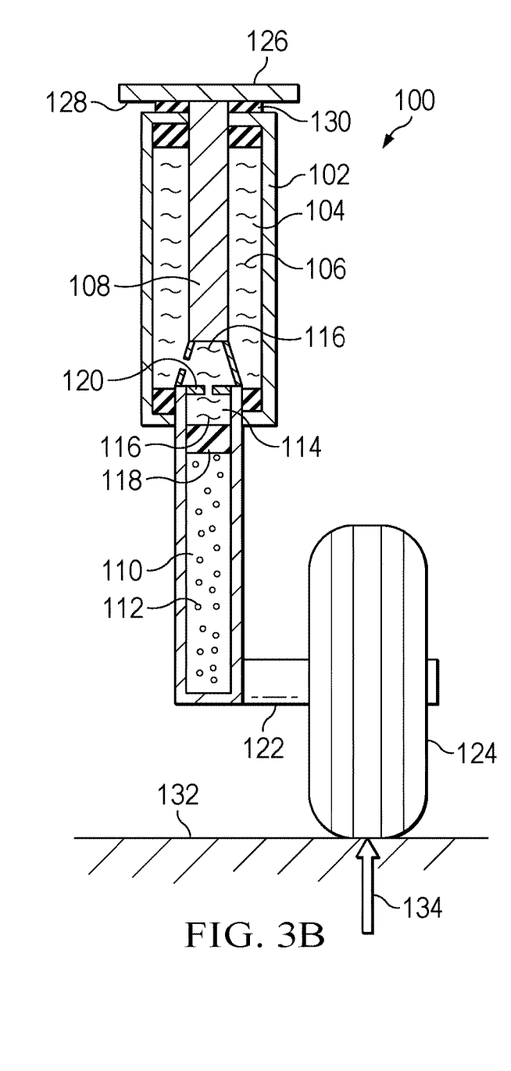
Figure 3C:
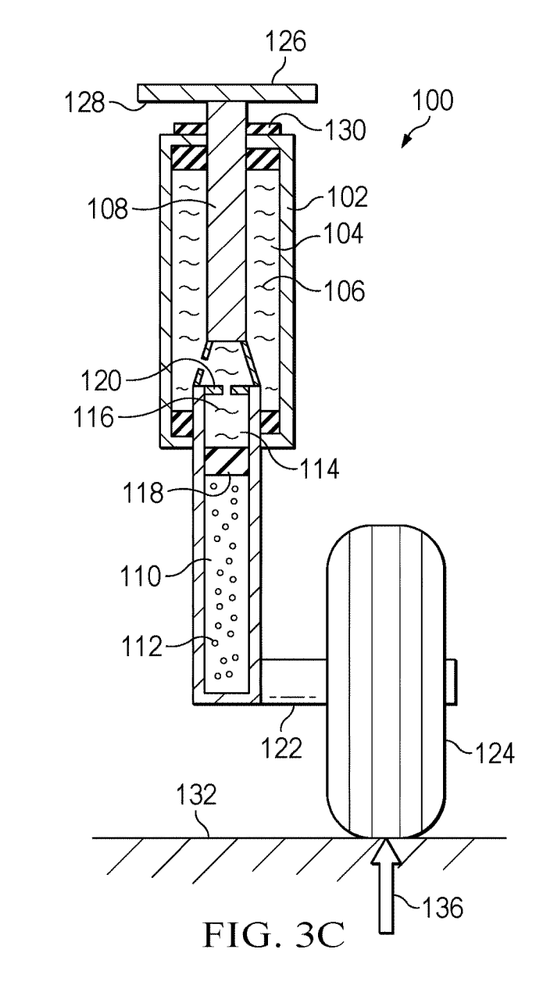
Figure 3D:
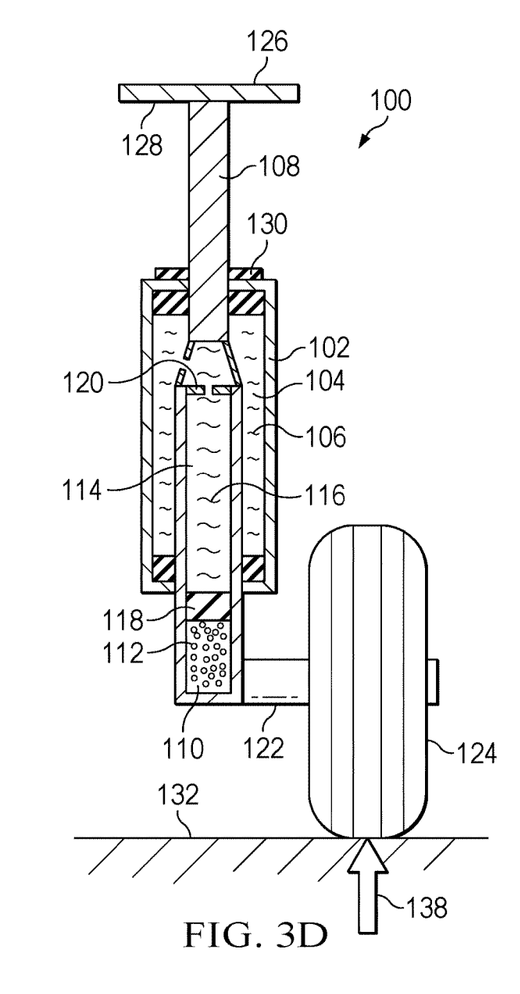

More specifically, FIG. 3B depicts a time period in which a landing force, as indicted by force arrow 134, is sufficient to reduce the tension in piston 108 but not yet sufficient to cause displacement of piston 108 relative to cylinder 102 due to the magnitude of landing force 134 and/or the duration of landing force 134, such as upon the initial contact between the aircraft and landing surface 132. FIG. 3C depicts a time period in which the landing force has increased as indicted by a larger force arrow 136, such as during the landing maneuver as more of the weight of the aircraft is supported by landing surface 132. In this time period, piston 108 is displaced relative to cylinder 102 causing an increase in the pressure in oil chamber 104. When the pressure in oil chamber 104 exceed that in oil chamber 114, liquid from oil chamber 104 passes through orifice 120 into oil chamber 114 which causes the volume of oil chamber 114 to increase and the volume of nitrogen chamber 110 to decrease, thereby further compressing the gas in nitrogen chamber 110 and increasing the pressure thereof. The rate at which liquid from oil chamber 104 passes through orifice 120 into oil chamber 114 is determined by the magnitude of landing force 136, the viscosity of the liquid, the size of orifice 120 and other factors known to those having ordinary skill in the art. FIG. 3D depicts a time period in which the force on wheel 124 represents the landed weight of the aircraft supported by landing gear 100 as indicted by a larger force arrow 138. In this time period, piston 108 is in a steady state condition, no longer displacing relative to cylinder 102, and the pressures in oil chamber 104, oil chamber 114 and nitrogen chamber 110 have equalized, thus completing the load balancing process.

Conventional weight on wheel sensors used to determine when the air to ground transition of a VTOL aircraft has taken place, such as limit switches or proximity switches, would typically provide an indication of the on the ground condition when landing gear 100 is in the position depicted in FIG. 3C, wherein significant displacement of piston 108 relative to cylinder 102 has occurred. It has been found, however, that in modern fly-by-wire VTOL aircraft, waiting until this significant displacement has occurred results in an undesirable delay in switching from the in the air control logic to the on the ground control logic. The present embodiments solve this problem by positioning force sensor 130 between an upper surface of cylinder 102 and extend stop surface 128 of piston 108 such that, in the fully extended position of landing gear 100, force sensor 130 experiences the preload force. In this unique configuration, when landing force 134 is sufficient to reduce the tension in piston 108, as best seen in FIG. 3B, force sensor 130 detects a reduction in the preload force at which time force sensor 130 can provide an early indication to the flight control system of the aircraft that the aircraft has transitioned from an in the air condition to an on the ground condition, thereby enabling the flight control system to transition from the in the air control logic to the on the ground control logic in a more timely manner.

Figure 4:
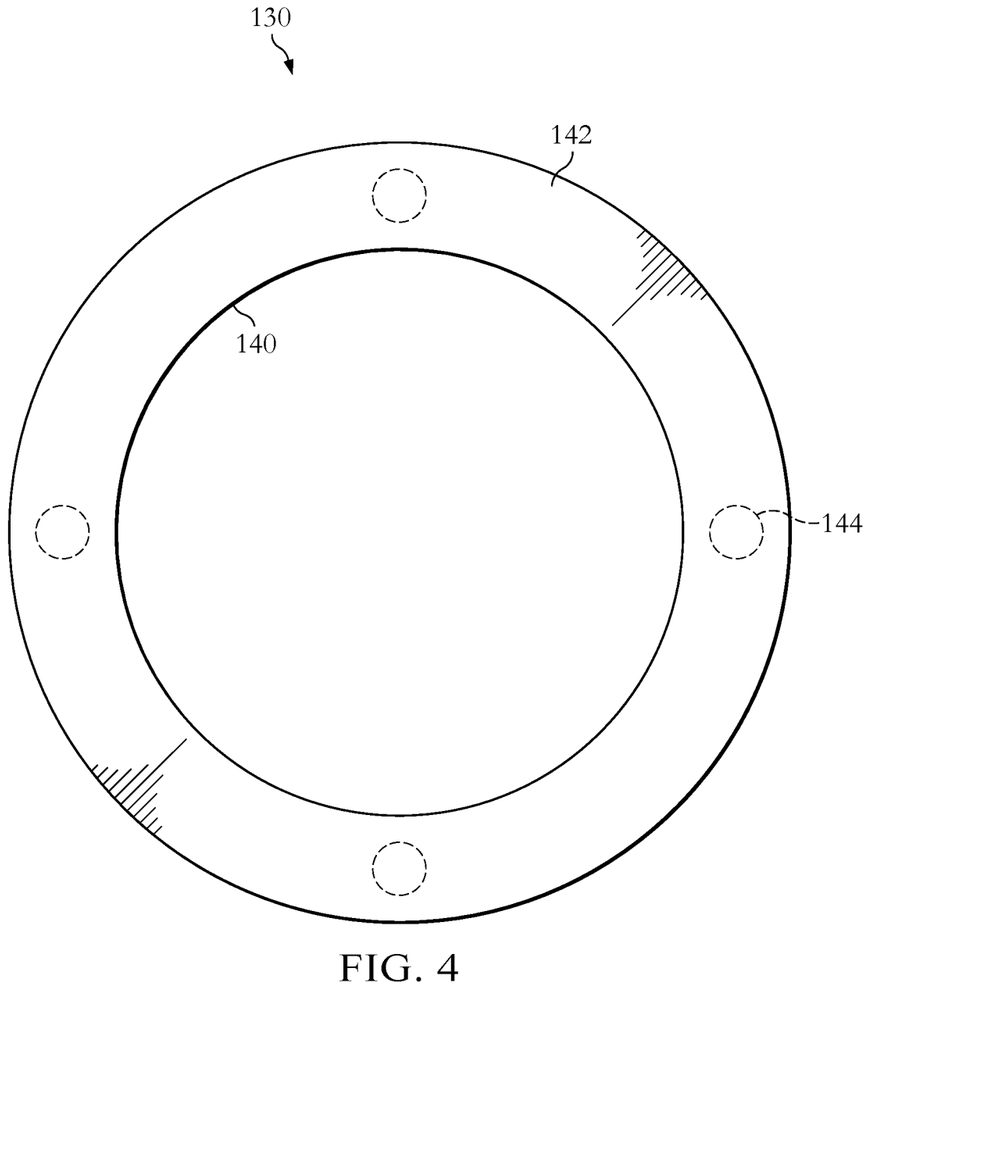
FIG. 4 is a top view of a force sensor for an on the ground detection system in accordance with embodiments of the present disclosure.

Referring additionally to FIG. 4 of the drawings, force sensor 130 will be described in greater detail. In the illustrated embodiment, force sensor 130 has the shape of a ring suitably sized to be positioned between an upper surface of cylinder 102 and extend stop surface 128 of piston 108 and having a central opening 140 configured to receive piston 108 therethrough. Preferably, force sensor 130 is coupled to the upper surface of cylinder 102 such that piston 108 is slidable relative to central opening 140. Alternatively, force sensor 130 could be coupled to piston 108 and movable therewith relative to cylinder 102. The main body 142 of force sensor 130 may be formed from a compressible material such as a polymer or an elastomer. Disposed within main body 142 are one or more force sensing elements 144 that are configured to detect the force applied to main body 142 and/or the change in force applied to main body 142 such as to detect a reduction in the preload force during load balancing of the landing gear. Suitable force sensing elements 144 include load cells, linear variable differential transformers, strain gauges, hydraulic pressure gauges and pneumatic pressure gauges.

For example, when force sensing elements 144 are transducers selected from the group of load cells, linear variable differential transformers and strain gauges, the transducers would respond to small displacements within main body 142 as the tensile force within piston 108 decreases and the compressive force in force sensor 130 decreases. These small displacements can be detected in the axial and/or circumferential directions of main body 142 depending upon the type and/or orientation of the transducers. When force sensing elements 144 are transducers selected from the group of hydraulic pressure gauges and pneumatic pressure gauges, the transducers would respond to pressure changes measured in fluid capsules or a fluid network within main body 142 as the tensile force within piston 108 decreases and the compressive force in force sensor 130 decreases. Even though force sensor 130 has been described and depicted as having four force sensing elements 144 distributed circumferentially within main body 142, it should be understood by those having ordinary skill in the art that a force sensor of the present disclosure could have other numbers of force sensing elements both greater than and less than four, including a single force sensing element. In addition, it should be understood by those having ordinary skill in the art that the force sensing elements within a force sensor of the present disclosure could be disposed in any uniform or nonuniform configuration within main body 142.

Referring now to FIGS. 5A-5D of the drawings, a land gear that is representative of landing gear 28a, 28b, 54a, 54b is schematically illustrated and generally designated 200. In the illustrated embodiment, landing gear 200 includes an air over oil shock strut depicted as having an outer cylinder 202 that defines a gas and liquid chamber referred to herein as air over oil chamber 204 that contains a gas such as air or nitrogen therein as indicated by stippling 206 and a hydraulic fluid such as oil therein as indicated by wavy lines 210. Slidably and sealingly received within cylinder 202 is a piston 208 that defines a liquid chamber referred to herein as oil chamber 212 that contains a hydraulic fluid such as oil therein as indicated by wavy lines 214. Oil chamber 212 is in fluid communication with air over oil chamber 204 via an orifice 216 that regulates the flow of liquid therebetween together with a metering pin 218 that adjusts the size of orifice 216.

In the illustrated embodiment, the lower portion of piston 208 extends through a lower end of cylinder 202 with the lower distal end of piston 208 coupled to a wheel assembly including an axle 222 and a wheel 224 that is rotatably coupled to axle 222. The upper portion of piston 208 is disposed within cylinder 202 with the upper end of piston 208 coupled to a cylindrical bearing and seal assembly 226 that has a lower surface configured to hold piston 208 in the fully extended position relative to cylinder 202 that is referred to herein as extend stop surface 228 and that is internal to cylinder 202. An on the ground detection system depicted as force sensor 230 is disposed between an upper surface of a cylindrical bearing and seal assembly 232 of cylinder 202 and extend stop surface 228 of piston 208. Force sensor 230 is preferably in communication with the aircraft's flight control system, such as flight control system 30 of aircraft 10 or flight control system 56 of helicopter 40, to provide a signal that the aircraft is on the ground such as to provide an early indication of when the aircraft has transitioned from an in the air condition to an on the ground condition during a landing maneuver.

Figure 5A:
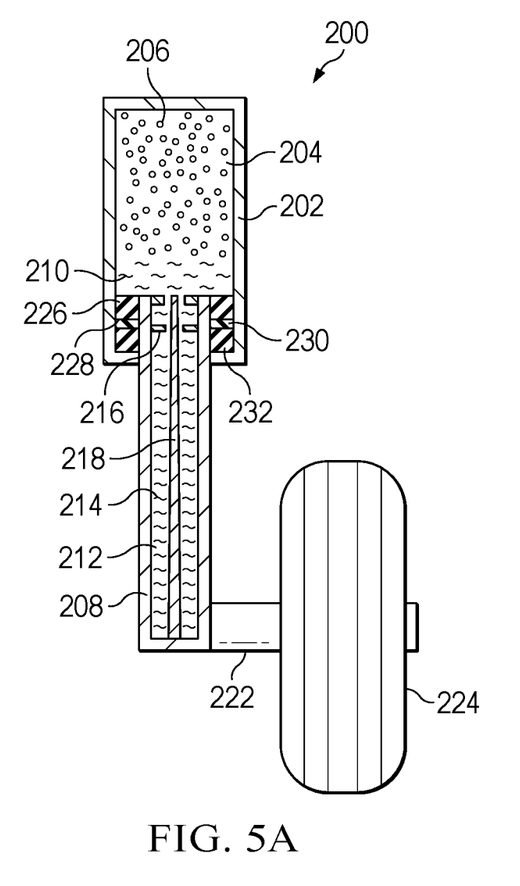
FIGS. 5A-5D are schematic illustrations of a landing gear with an on the ground detection system in various operating configurations in accordance with embodiments of the present disclosure.

The operation of landing gear 200 will now be described. In FIG. 5A, landing gear 200 is in the fully extended position. Landing gear 200 would be in this position, for example, when the aircraft has deployed landing gear 200 during flight in preparation for a landing maneuver. In the illustrated embodiment, the pressure of the gas in air over oil chamber 204 creates the force that causes piston 208 to be in the fully extended position relative to cylinder 202 with extend stop surface 228 preventing any further movement of piston 208 relative to cylinder 202. In this configuration, force sensor 230 experiences a compressive force referred to herein as a preload force. The preload force is a result of the reaction force between piston 208 and cylinder 202 at extend stop surface 228 created by the gas pressure in air over oil chamber 204 and the oil pressure in oil chamber 212 which places piston 208 in tension. When wheel 224 comes in contact with a landing surface 234, such as the ground, a landing force is exerted on wheel 224 by the landing surface 234. In response to the external landing force applied to wheel 224, landing gear 200 experiences a load balancing process that involves a reduction in the tensile force in piston 208, an increase in the pressure in oil chamber 212 as the liquid in oil chamber 212 is forced through orifice 216 and an increase in the pressure in air over oil chamber 204 as piston 208 moves upwardly relative to cylinder 202.

Figure 5B:
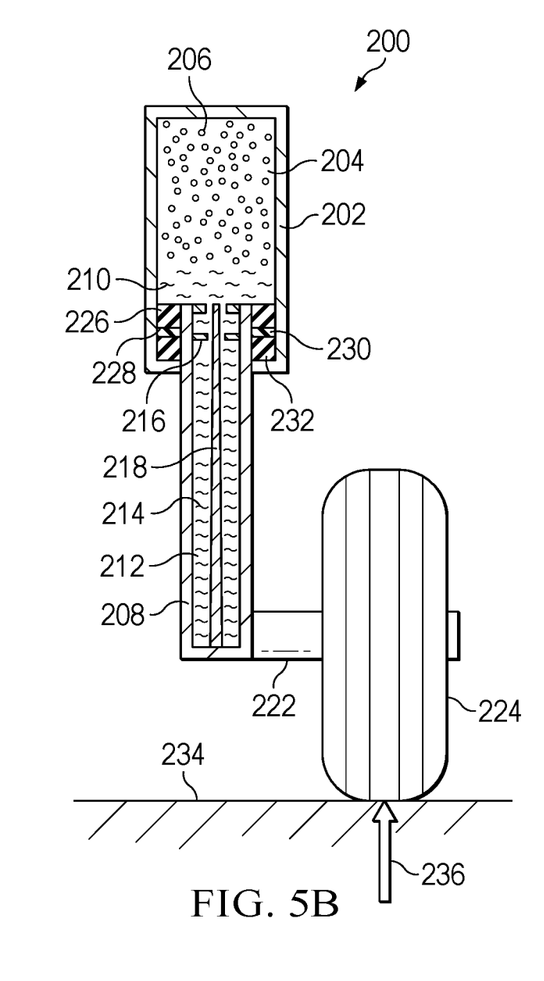
Figure 5C:
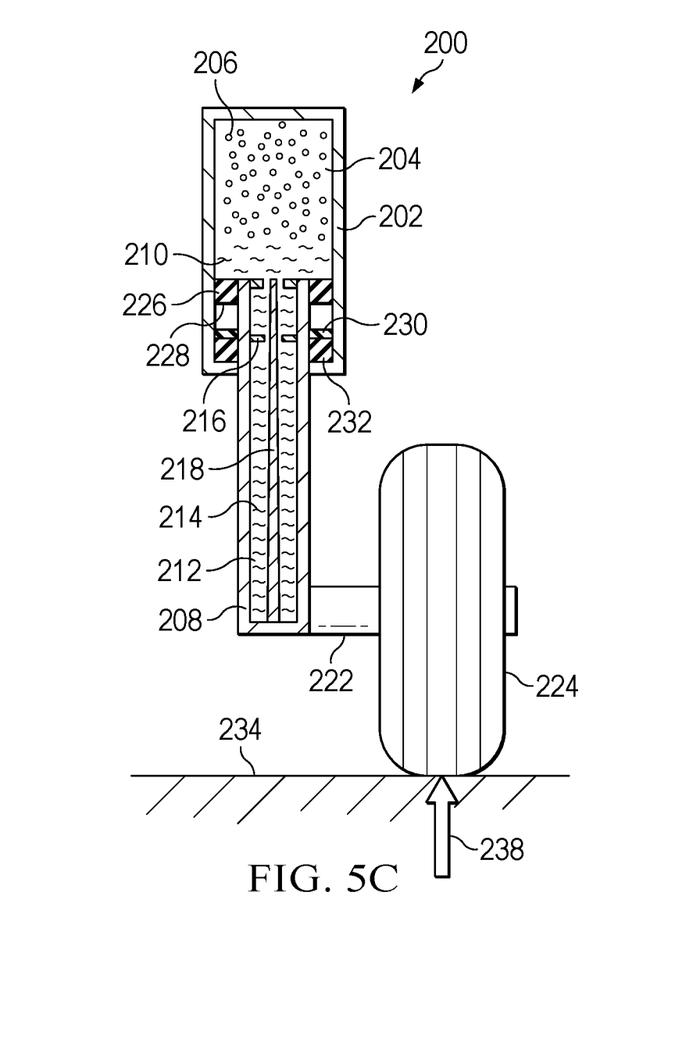
Figure 5D:
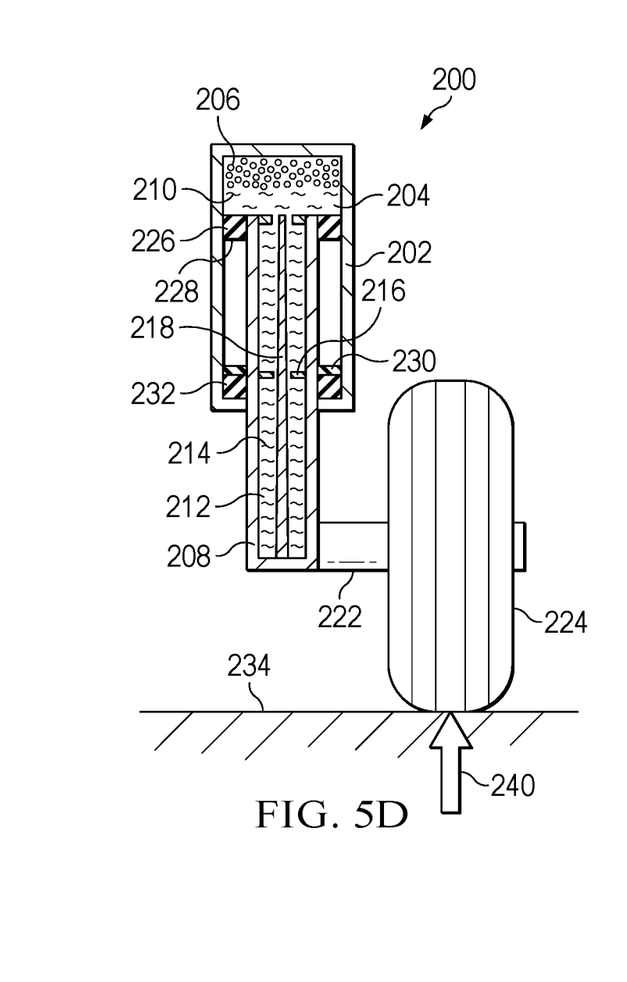

More specifically, FIG. 5B depicts a time period in which a landing force, as indicted by a force arrow 236, is sufficient to reduce the tension in piston 208 but not yet sufficient to cause displacement of piston 208 relative to cylinder 202 due to the magnitude of landing force 236 and/or the duration of landing force 236, such as upon the initial contact between the aircraft and landing surface 234. FIG. 5C depicts a time period in which the landing force has increased as indicted by a larger force arrow 238, such as during the landing maneuver as more of the weight of the aircraft is supported by landing surface 234. In this time period, piston 208 is displaced relative to cylinder 202 decreasing the volume of air over oil chamber 204 which further compress gas 206 therein. In addition, the displacement of piston 208 relative to cylinder 202 causes liquid in oil chamber 212 to passes through orifice 216 which regulates the speed at which piston 208 displaces relative to cylinder 202. The rate at which liquid passes through orifice 216 is determined by the magnitude of landing force 238, the viscosity of the liquid, the size of orifice 216, the shape of meter pin 218 and other factors known to those having ordinary skill in the art. FIG. 5D depicts a time period in which the force on wheel 224 represents the landed weight of the aircraft supported by landing gear 200 as indicted by a larger force arrow 240. In this time period, piston 208 is in a steady state condition, no longer displacing relative to cylinder 202, and the pressures in air over oil chamber 204 and oil chamber 212 have equalized, thus completing the load balancing process.

In the illustrated embodiment, by positioning force sensor 230 between an upper surface of cylinder 202 and extend stop surface 228 of piston 208, in the fully extended position of landing gear 200, force sensor 230 experiences the preload force. In this unique configuration, when landing force 236 is sufficient to reduce the tension in piston 208, as best seen in FIG. 5B, force sensor 230 detects a reduction in the preload force at which time force sensor 230 can provide an early indication to the flight control system of the aircraft that the aircraft has transitioned from an in the air condition to an on the ground condition, thereby enabling the flight control system to transition from the in the air control logic to the on the ground control logic.

Figure 6A:
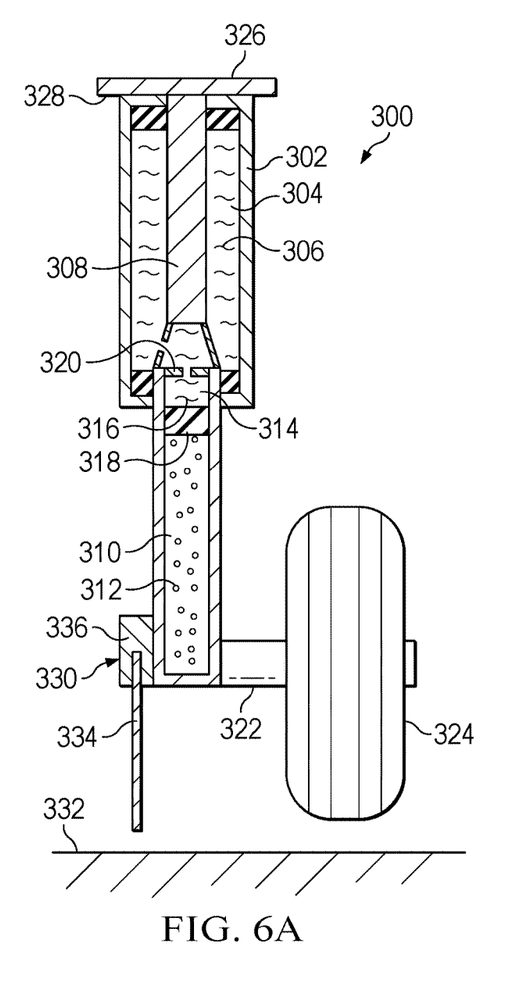
FIGS. 6A-6B are schematic illustrations of a landing gear with an on the ground detection system in various operating configurations in accordance with embodiments of the present disclosure.
Figure 6B:
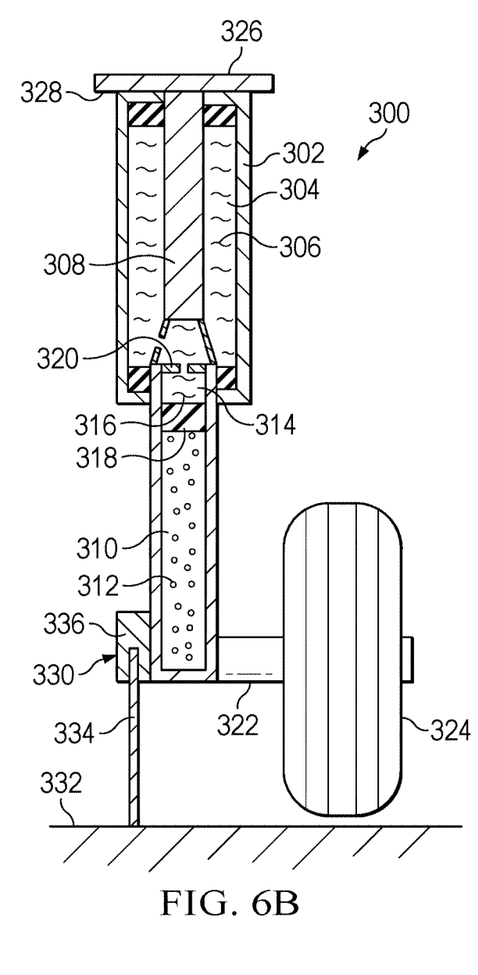

Referring now to FIGS. 6A-6B of the drawings, a land gear that is representative of landing gear 28a, 28b, 54a, 54b is schematically illustrated and generally designated 300. In the illustrated embodiment, landing gear 300 includes a thru-piston shock strut depicted as having an outer cylinder 302 that defines a liquid chamber referred to herein as oil chamber 304 that contains a hydraulic fluid such as oil therein as indicated by wavy lines 306. Slidably and sealingly received within and extending through cylinder 302 is a piston 308 that defines a gas chamber referred to herein as air chamber or nitrogen chamber 310 that contains a gas such as air or nitrogen therein as indicated by stippling 312. Piston 308 also defines a liquid chamber referred herein as oil chamber 314 that contains a hydraulic fluid such as oil therein as indicated by wavy lines 316. Fluid communication between nitrogen chamber 310 and oil chamber 314 is prevented by a fluid separator 318 that is positioned between nitrogen chamber 310 and oil chamber 314. Fluid separator 318 is a floating separator that not only isolates the gas in nitrogen chamber 310 from the liquid in oil chamber 314 but also enables pressure balancing between nitrogen chamber 310 and oil chamber 314. Oil chamber 314 is in fluid communication with oil chamber 304 via an orifice 320 that regulates the flow of liquid therebetween.

In the illustrated embodiment, the lower portion of piston 308 extends through a lower end of cylinder 302 with the lower distal end of piston 308 coupled to a wheel assembly including an axle 322 and a wheel 324 that is rotatably coupled to axle 322. The upper portion of piston 308 extends through an upper end of cylinder 302 with the upper end of piston 308 coupled to a flange 326 that has a lower surface configured to hold piston 308 in the fully extended position relative to cylinder 302 that is referred to herein as extend stop surface 328. An on the ground detection system 330 is coupled the lower distal end of piston 308 opposite the wheel assembly. On the ground detection system 330 is preferably in communication with the aircraft's flight control system, such as flight control system 30 of aircraft 10 or flight control system 56 of helicopter 40, to provide a signal that the aircraft is on the ground such as to provide an early indication of when the aircraft has transitioned from an in the air condition to an on the ground condition during a landing maneuver.

Landing gear 300 operates substantially similar to landing gear 100 described herein with the exception of on the ground detection system 330. In FIG. 6A, landing gear 300 has been deployed in preparation for a landing maneuver and is approaching a landing surface 332. In the illustrated embodiment, on the ground detection system 330 includes a rod 334 that extends below wheel 324 and comes in contact with landing surface 332 before wheel 324 comes in contact with landing surface 332, as best seen in FIG. 6B. Rod 334 may be a flexible rod that bends upon contact with landing surface 332 changing electrical properties within rod 334 to provide an early indication of when the aircraft has transitioned from an in the air condition to an on the ground condition. In such embodiments, rod 334 may have uniform flexibility along its length or may have one or more flexible sections that preferentially bend upon contact with landing surface 332. Alternatively, rod 334 may be a substantially rigid rod that pivots and/or tilts relative to housing 336 to provide the early indication of when the aircraft has transitioned from an in the air condition to an on the ground condition. In some embodiments, rod 334 may be part of a static electricity discharge system that discharges static electricity from the aircraft upon ground contact wherein rod 334 acts as a static discharge wick to provide a grounding path for the static discharge in addition to acting as an on the ground detection sensor.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A landing gear for an aircraft having a fuselage, the landing gear comprising:

a landing strut having proximal and distal ends, the proximal end couplable to the fuselage, the landing strut including a gas chamber, a liquid chamber, a cylinder and a piston that is movable relative to the cylinder between extended and retracted positions, the piston having an extend stop surface, the gas chamber disposed within one of the cylinder or the piston, the liquid chamber disposed within the other of the cylinder or the piston;

a wheel coupled to the distal end of the landing strut; and a force sensor disposed between the extend stop surface of the piston and the cylinder;

wherein, pressurized gas in the gas chamber biases the piston to the extended position such that the force sensor experiences a preload force; and wherein, the force sensor is configured to detect a reduction in the preload force during a landing maneuver responsive to contact between the wheel and a landing surface.

2. The landing gear as recited in claim 1 wherein the landing strut is a thru-piston shock strut wherein the cylinder includes the liquid chamber and the piston includes the gas chamber.

3. The landing gear as recited in claim 1 wherein the landing strut is a gas over liquid shock strut wherein the piston includes the liquid chamber and the cylinder includes the gas chamber.

4. The landing gear as recited in claim 1 wherein the liquid chamber further comprises an oil chamber.

5. The landing gear as recited in claim 1 wherein the gas chamber further comprises an air chamber.

6. The landing gear as recited in claim 1 wherein the gas chamber further comprises a nitrogen chamber.

7. The landing gear as recited in claim 1 wherein the force sensor further comprises at least one load cell.

8. The landing gear as recited in claim 1 wherein the force sensor further comprises at least one linear variable differential transformer.

9. The landing gear as recited in claim 1 wherein the force sensor further comprises at least one strain gauge.

10. The landing gear as recited in claim 1 wherein the force sensor further comprises at least one pneumatic pressure sensor.

11. The landing gear as recited in claim 1 wherein the force sensor further comprises at least one hydraulic pressure sensor.

12. The landing gear as recited in claim 1 wherein the force sensor further comprises a compressible ring having a central opening configured to slidably receive the piston therethrough and having a main body with at least one force sensing element disposed therein.

13. The landing gear as recited in claim 1 wherein the force sensor is configured to detect the reduction in force from the preload force during load balancing of the landing strut as the piston transitions from tension to compression during the landing maneuver.

14. The landing gear as recited in claim 1 wherein the force sensor is configured to detect the reduction in force from the preload force during load balancing of the landing strut before the extend stop surface of the piston translates relative to the cylinder during the landing maneuver.

15. The landing gear as recited in claim 1 wherein the force sensor is configured to detect the reduction in force from the preload force during load balancing of the landing strut when the extend stop surface of the piston translates relative to the cylinder during the landing maneuver.

16. The landing gear as recited in claim 1 wherein the extend stop surface of the piston is internal to the cylinder.

17. The landing gear as recited in claim 1 wherein the extend stop surface of the piston is external of the cylinder.

18. An aircraft comprising:

a fuselage;

a plurality of landing gear coupled to the fuselage, each landing gear including:

a landing strut having proximal and distal ends, the proximal end couplable to the fuselage, the landing strut including a gas chamber, a liquid chamber, a cylinder and a piston that is movable relative to the cylinder between extended and retracted positions, the piston having an extend stop surface, the gas chamber disposed within one of the cylinder or the piston, the liquid chamber disposed within the other of the cylinder or the piston;

a wheel coupled to the distal end of the landing strut; and a force sensor disposed between the extend stop surface of the piston and the cylinder;

wherein, pressurized gas in the gas chamber biases the piston to the extended position such that the force sensor experiences a preload force; and wherein, the force sensor is configured to detect a reduction in the preload force during a landing maneuver responsive to contact between the wheel and a landing surface.

19. The aircraft as recited in claim 18 wherein the aircraft is a rotorcraft.

20. The aircraft as recited in claim 18 wherein the aircraft is a tiltrotor aircraft.

* * * * *